United States Patent [19]

Siegel

[11] 3,742,125

[45] June 26, 1973

[54] COLOR VIDEO ABSTRACT SYNTHESIZER

[75] Inventor: Eric J. Siegel, New York, N.Y.

[73] Assignee: Electronic Visions, Inc., New York, N.Y.

[22] Filed: June 11, 1971

[21] Appl. No.: 152,349

[52] U.S. Cl. .......... 178/5.2 R, 178/6.8

[51] Int. Cl. .......... H04n 9/02

[58] Field of Search .......... 178/5.4 R, DIG. 6, 178/6.8; 315/23; 179/1 US; 340/324

[56] References Cited

UNITED STATES PATENTS

| | | | |
|---|---|---|---|
| 2,804,500 | 8/1957 | Giacoletto | 178/5.4 R |
| 3,175,121 | 3/1965 | Birmbaum et al. | 315/23 |
| 3,604,852 | 9/1971 | Weintraub | 178/5.4 R |
| 3,627,912 | 12/1971 | Hearn | 178/5.4 R |

*Primary Examiner*—Richard Murray
*Attorney*—Hubbell, Cohen & Stiefel

[57] ABSTRACT

An apparatus for synthesizing a color video abstract signal having a selectable color content characteristic and geometric form characteristic by a programmable predetermined mixing of the outputs of a plurality of pattern generators and a pseudo chrominance signal. The pseudo chrominance signal has variable hue and saturation characteristics, the color content characteristic being dependent upon the hue and saturation characteristics. In addition, the pattern generators are capable of providing a plurality of different selectable predetermined waveform configurations which configurations are, in turn, capable of providing at least two different geometric form characteristics. Both the color content characteristic and the geometric form characteristic of the resultant color video abstract signal are capable of being varied in a predetermined fashion. The pattern generator may be synced to a submultiple of the vertical or horizontal rate to provide a color video abstract display which is stable but may be electronically positioned on the display screen. In addition, the mixing of the various pattern generators is accomplished through a video switch in accordance with a preprogrammed interconnection of the various devices. By controlling the operation of the video switch, different geometric form characteristics with respect to both size and shape as well as zoom-in and zoom-out effect for the resultant video abstract display may be provided. Furthermore, a strobe effect for the resultant video abstract display may also be provided wherein the polarity of the color video abstract signal is reversed at a predetermined frequency so as to vary the signal from negative to positive and vice versa. In addition, a keyboard is provided for intermittently varying the preprogrammed interconnection of the devices so as to provide a different color video abstract display.

18 Claims, 18 Drawing Figures

COLOR VIDEO ABSTRACT SYNTHESIZER

BACKGROUND OF THE INVENTION

1. Field of the Invention

The present invention relates to synthesizers for providing a video abstract signal having controllable characteristics.

2. Description of the Prior Art

Prior art systems for providing video abstracts are not true synthesizers. These systems, such as disclosed in U.S. Pat. No. 2,804,500, provide a video abstract display which is directly dependent upon input signals which are externally provided. The color content and geometric form of the resultant video abstract display are not selectable by the operator so as to enable the controlled selection of a desired predetermined geometric form and color for the video abstract display. Rather, the color content and geometric form of the resultant video abstract are arbitrary, being dependent, for example, on an external audio input signal, such as music. Therefore, controllable well defined geometric forms cannot be produced by these prior art systems; rather, an arbitrary geometric pattern is produced. Thus, there is no predictable way in which the operator can produce, for example, a diamond shaped pattern of a predetermined color or a circular pattern of that color in a predetermined sequence. Furthermore, none of these prior art systems provide a video color abstract in which the color content and geometric form are both capable of being varied in a predetermined fashion. These prior art systems, are only capable of providing Lissajous figures as a result of either applying identical waveform configurations, namely sinusoids, to the horizontal and vertical beam deflecting mans of a cathode ray display tube either direct control of the externally applied input signals or independent thereof, the input signal also being a sinusoid waveform configuration. Thus, the resultant geometric form must inherently be dependent solely on the sinusoidal waveform configurations and, therefore, these systems are not capable of providing other geometric forms which may be controllably selected. These prior art systems, therefore, do not enable an operator to compose a video color abstract display of his own choosing which is particularly aesthetically pleasing to him and which may be varied as his mood varies.

SUMMARY OF THE INVENTION

An apparatus for synthesizing a color video abstract signal having a selectable color content characteristic and geometric form characteristic is provided. The apparatus includes a means for providing at least two signals having different predetermined waveform configurations, such as pattern generators, the waveform configurations being capable of providing generators at least two different geometric form characteristics, such as diamond, a square, a circle, a triangle or an ellipse. In addition, the apparatus includes means for providing a pseudo chrominance signal, such as a color encoder, from at least two different color signals. The pseudo chrominance signal has variable hue and saturation characteristics, the color content characteristic of the color video abstract signal being dependent on the hue and saturation characteristics. Means are also included for controllably mixing the pseudo chrominance signal and the signals having predetermined waveform configurations in order to select a predetermined color content characteristic and geometric form characteristic for the color video abstract signal.

Preferably, the apparatus includes a video processing amplifier which takes a raw synthesized video signal and provides a black level, blanking signal, burst signal and sync pulse therefor in order to provide a composite video output, a color encoder circuit for providing the pseudo chrominance signal, a plurality of pattern generators for providing the different waveform configurations, a video switch means for mixing the various outputs of the pattern generators to provide the resultant geometric forms, and a means for controlling the position of the resultant geometric form in the resultant video abstract display such as a means for centering the pattern on the screen, all of which are connected through a program board which may be wired for any desired interconnection of the various devices so as to provide a predetermined video abstract display format. In addition, a keyboard means is provided for intermittently varying the interconnection of these devices by depressing a given key so as to vary the video abstract display in a predetermined fashion in this manner. In addition, the program board may be rewired to provide a different video abstract display. The video switch means control input signal may be varied so as to provide various different effects for the video abstract display such as a zoom in-and-out effect for the display, or a "sliding door" effect for the display in which the screen is either completely covered up by a given color or else is gradually opened as if by means of sliding doors on either side to provide the underlying program color, first in part between the two sliding doors and then, when the sliding doors have been completely opened, in its entirety on the screen.

The pattern generators preferably provide triangular waveform configurations, parabolic waveform configurations, squarewave configurations and sawtooth waveform configurations so as to provide any desired geometric form for the video abstract display, such as a circle having a variable aspect ratio to provide an ellipse of any desired foci, a square pattern, or a diamond pattern, all of which may be varied in size and shape. In addition, means are provided for reversing the polarity of the color video abstract signal at a predetermined frequency so as to provide a strobe effect for the resultant color video abstract display in which the resultant display alternates between a negative and a positive display.

DETAILED DESCRIPTION OF THE PREFERRED EMBODIMENT

Figures 1, 2:
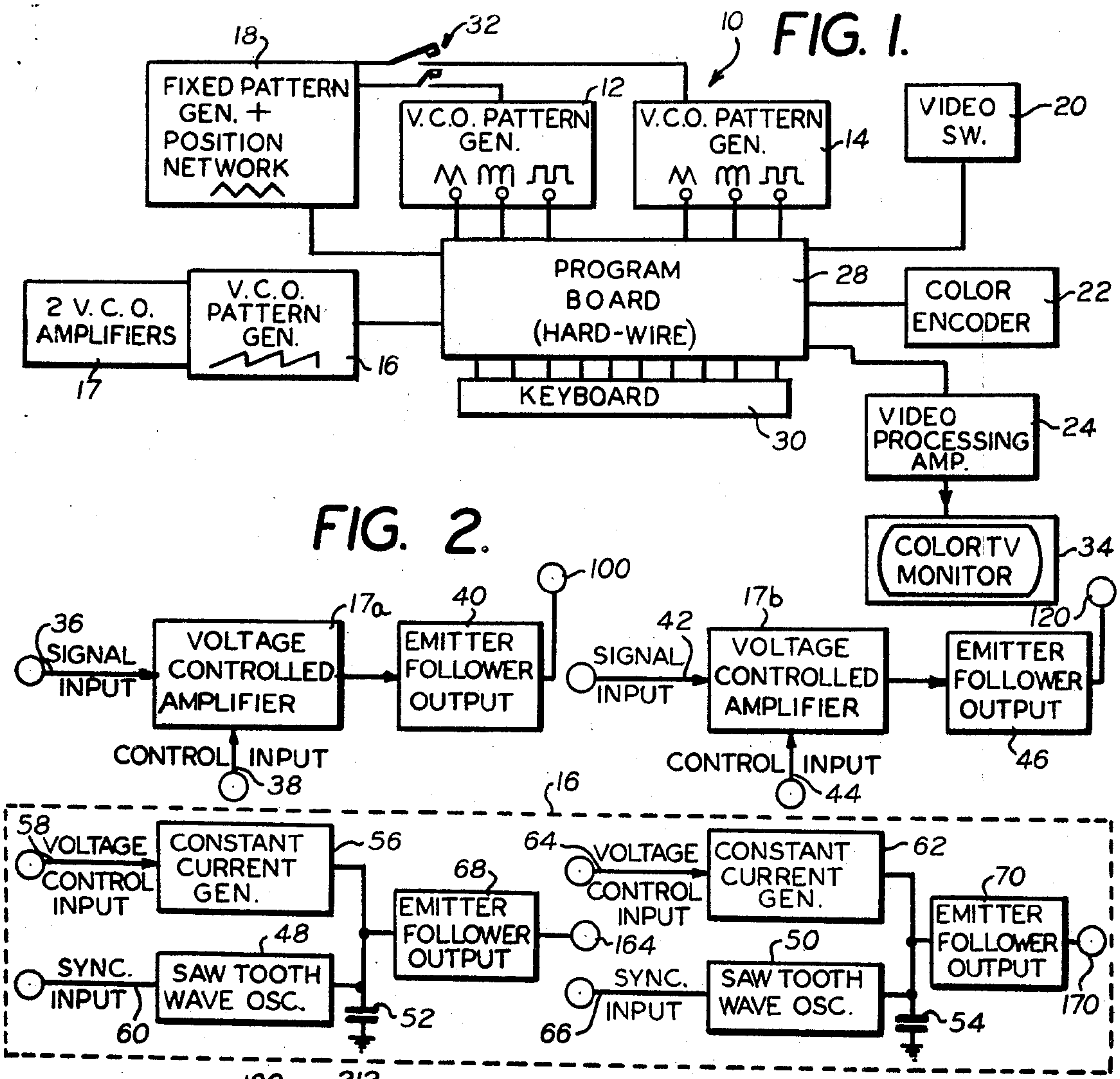
FIG. 1 is a block diagram of the preferred embodiment of the overall system of the present invention.
FIG. 2 is a more detailed block diagram of the voltage controlled amplifier and sawtooth pattern generator portions of FIG. 1.
Figure 3:
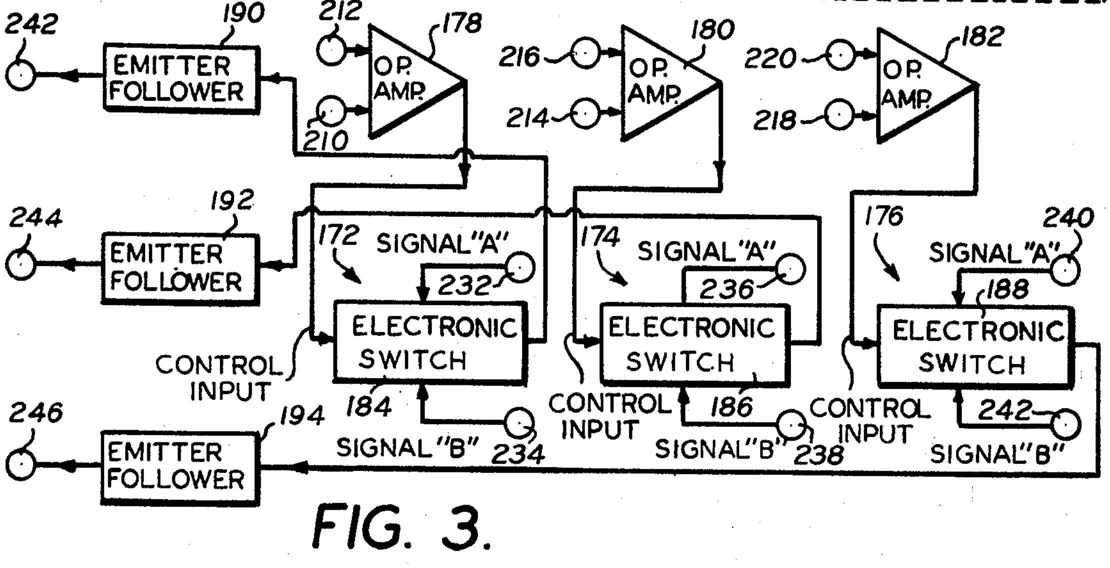
FIG. 3 is a more detailed block diagram of the video switch portion of FIG. 1.

Referring now to the drawings in detail and especially to FIG. 1 thereof. FIG. 1 is a block diagram of the color video abstract synthesizer of the present invention, which synthesizer is generally referred to by the reference numeral 10. The synthesizer 10 of the present invention preferably includes a plurality of voltage controlled oscillator pattern generators 12, 14 and 16. Pattern generators 12 and 14 are preferably identical and will be described in greater detail hereinafter. Preferably, pattern generators 12 and 14 each provide a triangular waveform configuration output, a parabolic waveform configuration output and a square-wave configuration output, in a manner to be described in greater detail hereinafter. Pattern generator 16 preferably provides a sawtooth waveform configuration output. As will be described in greater detail hereinafter, a pair of voltage controlled oscillator amplifiers 17 are operatively connected to pattern generator 16. Synthesizer 10 also includes a fixed pattern generator and pattern position control portion generally represented by the reference numeral 18, a video switch configuration 20, a color encoder 22 and a video processing amplifier 24, all to be described in greater detail hereinafter.

Pattern generators 12, 14 and 16, fixed pattern generator and pattern position network 18, video switch configuration 20, color encoder 22 and video processing amplifier 24 are all preferably operatively connected to a programming board 28 which may be pre-wired for any desired color video abstract display, as will be described in greater detail hereinafter. Of course, if desired, an electronic programming arrangement, such as a logic gate configuration responsive to electronic control signals, may be utilized in place of the pre-wired program board. A conventional type of keyboard arrangement 30 is preferably connected to the program board 28 to intermittently provide a closed circuit interconnection between various components of the synthesizer 10 when a given key is depressed. The keyboard 30 together with the program board 28 are preferably pre-wired to provide rapid changes in the resultant color video abstract display by the depressing of a given key on the keyboard 30, a different key preferably providing a different variation from the resultant color video abstract display.

As will be described in greater detail hereinafter, the color encoder 22 preferably provides a chroma signal, which is a pseudo chrominance signal, and a color burst signal, the chroma signal providing the three primary colors, red, blue and green, as well as the color magenta and various hues thereof. The pattern position network 18, as will be described in greater detail hereinafter, preferably includes means for providing a locking sync signal for control of pattern generators 12 and 14, such as a horizontal or vertical locking sync signal, such means being diagrammatically represented by switch 32. As was previously mentioned, the program board 28 is wired to interconnect the various devices 12 through 24, inclusive, in any desired fashion so as to produce a predetermined signal mix of colors and waveform configurations so as to produce a particular associated video color abstract signal having a predetermined color content characteristic and a predetermined geometric form characteristic, resulting in a predetermined color video abstract display of predetermined color and geometric form on a conventional color television monitor 34. As will be described in greater detail hereinafter, preferably all the signals utilized in the synthesizer 10 are DC coupled so as to eliminate the need for DC restoration, all circuitry preferably operating in the zero through one volt DC range.

VOLTAGE CONTROLLED AMPLIFIER AND SAWTOOTH PATTERN GENERATORS

Referring now to FIG. 2, the voltage controlled amplifiers are represented by amplifiers **17*a* nd 17*b*. Voltage control amplifier 17*a* receives a signal input via path 36 and a control input via path 38 and provides an output through an emitter follower network 40. Similarly, voltage control amplifier 17*b* receives a signal input via path 42 and a control input via path 44 and provides an output through an emitter follower 46. The sawtooth pattern generator portion 16 preferably includes a pair of ultralinear conventional sawtooth wave oscillators 48 and 50 which are voltage controlled, the approximate frequency being preferably determined by external switchable capacitors 52 and 54, respectively, which are operatively connected to the sawtooth wave oscillators 48 and 50 as shown in greater detail in FIG. 8. As will be explained in greater detail hereinafter, a constant current generator 56 is operatively connected to the sawtooth wave oscillator output 48 for controlling oscillator 48 in accordance with the voltage control input to the constant current generator 56 provided via path 58. In addition, a synchronizing signal input is provided via path 60 for synchronizing the sawtooth wave oscillator 48. Similarly, for sawtooth wave oscillator 50, a constant current generator 62 having a voltage controlled input provided via path 64 is connected to the output of sawtooth wave oscillator 50 for controlling the oscillator in a manner to be described in greater detail hereinafter, and a synchronizing signal input is provided via path 66 for synchronizing the sawtooth wave oscillator 50. The outputs of sawtooth wave oscillators 48 and 50 are preferably, respectively, provided via emitter followers 68 and 70.**

Figure 8:
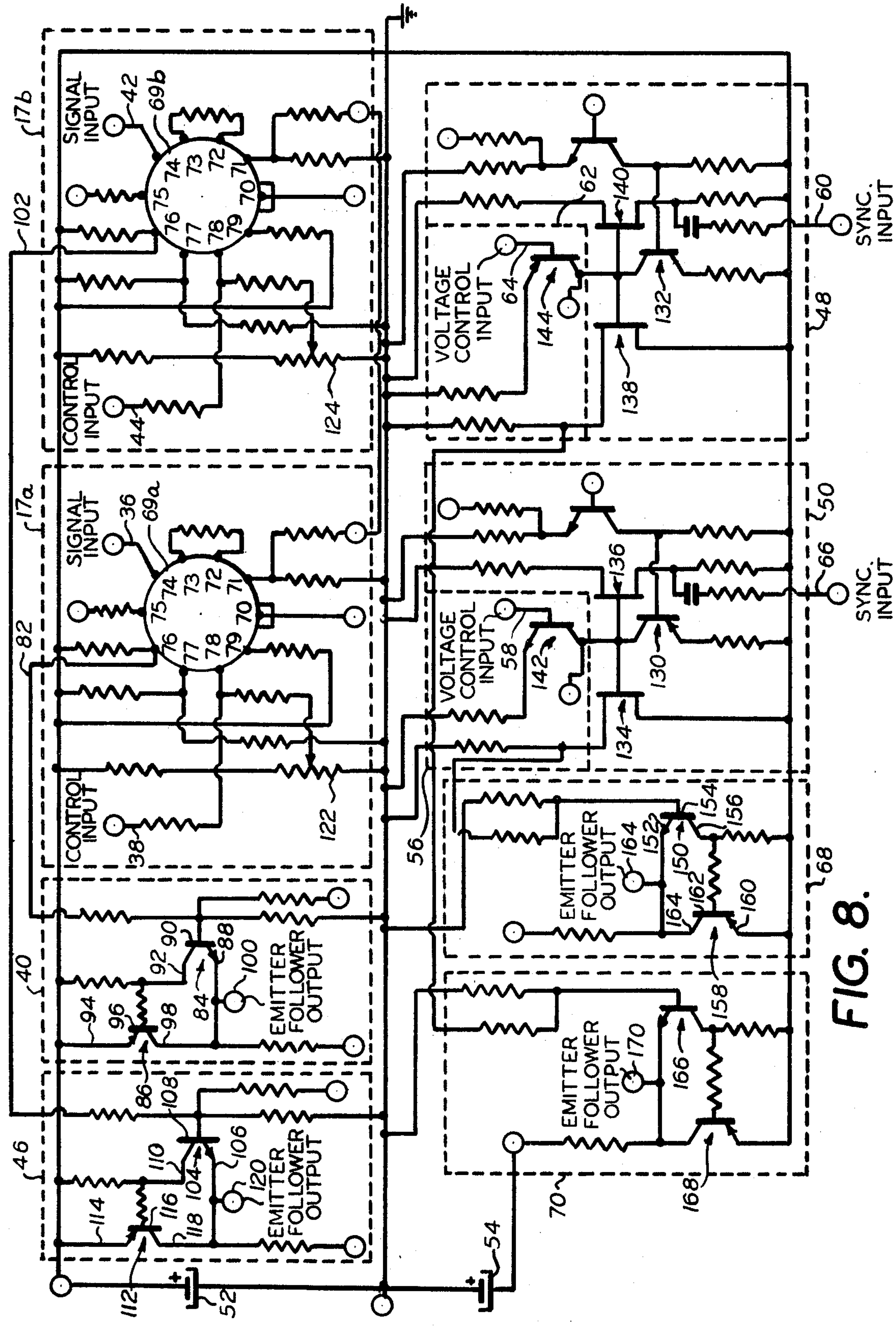
FIG. 8 is a schematic diagram of the circuit shown in FIG. 2.
Figure 9:
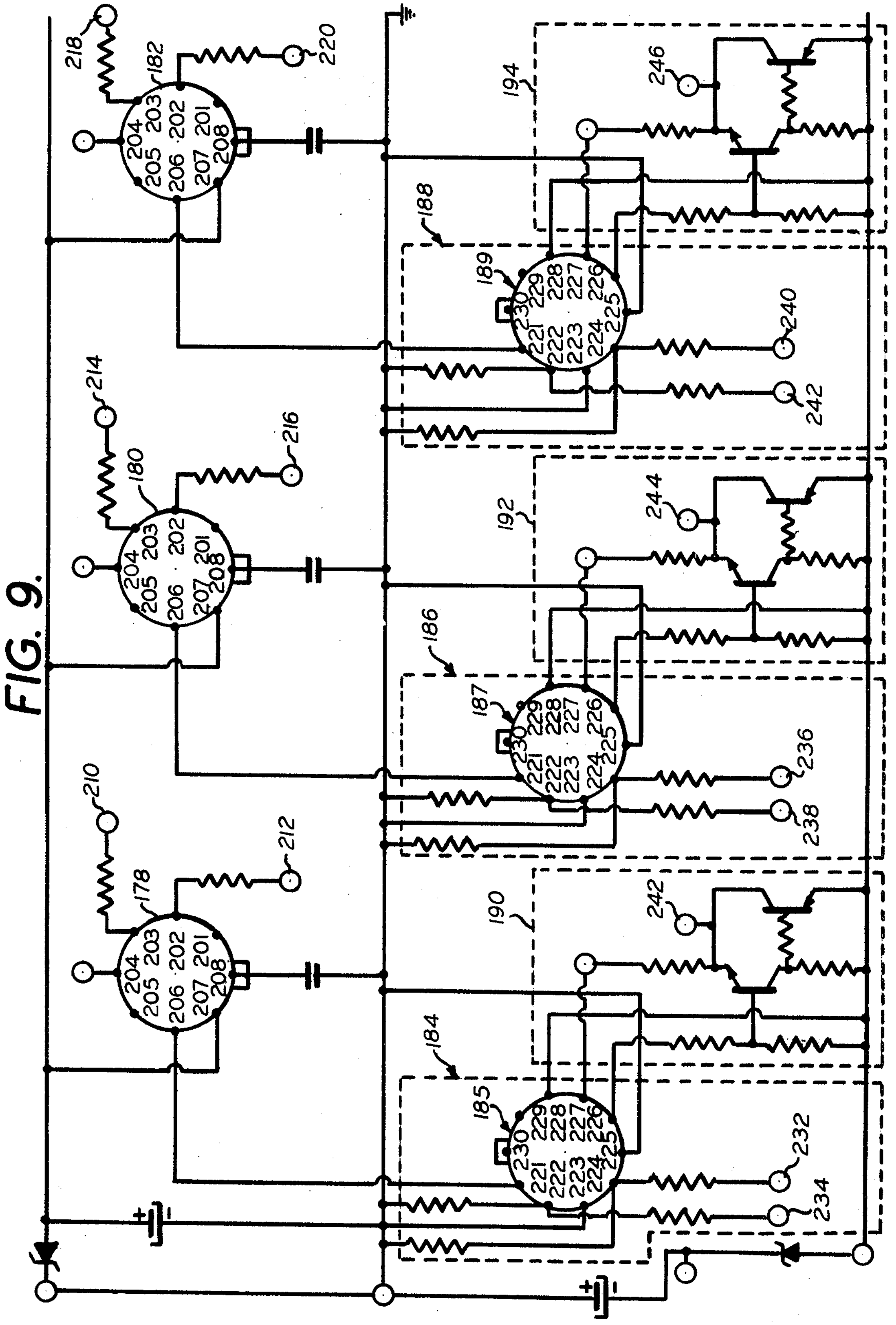
FIG. 9 s a schematic diagram of the circuit shown n FIG. 3.
Figure 15:
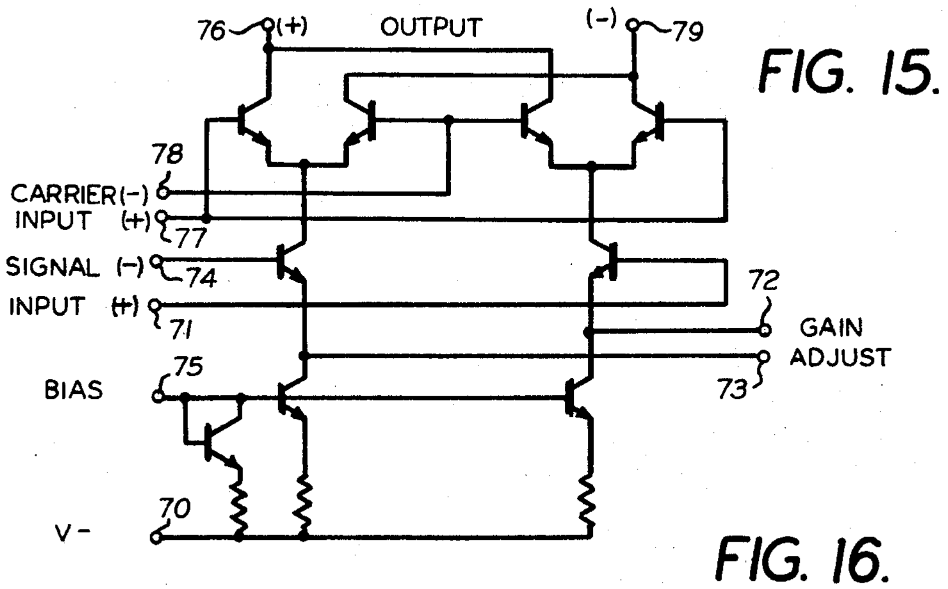
FIG. 15 is a schematic diagram of a typical double-balanced modulator/demodulator integrated circuit such as utilized in FIGS. 8 and 10.

Referring now to FIGS. 8 and 15 and describing the voltage controlled amplifier 17 and sawtooth waveform generator 16 in greater detail. Preferably, the voltage control amplifiers 17*a* and 17*b* are conventional linear integrated circuit double balanced modulator configurations such as the type manufactured by Fairchild Semiconductor under the designation μa796, the equivalent circuit thereof being shown in FIG. 15. This integrated circuit is connected as shown in FIG. 8 with the corresponding pin numbers 70, 71, 72, 73, 74, 75, 76, 77, 78 and 79 connected as shown in FIG. 8 to the configuration shown in FIG. 15. Preferably, the linear integrated circuit 69*a*, for voltage controlled amplifier 17*a*, and 69*b*, for voltage controlled amplifier 17*b*, are identical. The resistor network associated with integrated circuits 69*a* and 69*b*, respectively, is conventional for utilization of such an integrated circuit as Fairchild μa796 as a voltage controlled amplifier and will not be described in greater detail hereinafter.

The output of the integrated circuit configuration 69*a* is connected via path 82 to the output of a conventional emitter follower configuration 40 having an NPN transistor 84 and PNP transistor 86 connected in an emitter follower configuration with an associated resistor network and will not be described in greater detail hereinafter. Suffice it to say that transistors 84 and 86 each include an emitter base and collector, 88, 90 and 92, for transistor 84, and 94, 96 and 98 for transistor 86. The output of emitter follower configuration 40 is provided from collector 98 of transistor 86 at point 100. Similarly, for voltage controlled amplifier 17*b*, the output of the integrated circuit 69*b* is connected via path 102 to another emitter follower configuration 46, which is preferably identical to the emitter follower configuration 40 and includes a NPN transistor 104 having an emitter 106, a base 108 and a collector 110, and a PNP transistor 112 having an emitter 114, a base 116 and a collector 118 connected in a low impedance conventional emitter follower configuration. The output of emitter follower configuration 46 is provided from collector 118 at point 120.

As will be described in greater detail hereinafter, if the bias potential of the integrated circuits 69*a* and 69*b* is changed, these circuits 69*a* and 69*b* can be utilized as polarity reversal amplifiers. This is accomplished by varying the bias potential by means of variable impedance 122 for circuit 69*a* and 124 for integrated circuit 69*b*. The polarity reversal function is utilized for providing a strobe effect for the resultant color video abstract display; that is, the strobing of a negative to a positive picture and vice versa. In such an instance, an oscillator is connected to the signal inputs 36 and 42 of circuits 69*a* and 69*b* with the strobe output signals being provided from the associated emitter follower configurations at points 100 and 120, respectively.

The sawtooth wave oscillators 50 and 48 are conventional ultralinear sawtooth wave oscillator configurations utilizing an NPN transistor 130 and 132, respectively, for oscillators 50 and 48, as output buffer amplifiers for unijunction transistor pairs 134–136 for oscillator 50 and 138–140 for oscillator 48. The balance of the associated conventional circuitry is for improving the linearity of the sawtooth to provide an ultralinear sawtooth waveform in response to the synchronizing signal input via path 66, and 60 for oscillators 50 and 48, respectively. The constant current generators 56 and 62 are conventional constant current generators utilizing PNP transistors 142 and 143 for oscillator 50, and 144 and 145 for oscillator 48, and will not be described in greater detail hereinafter. Suffice it to say that the constant current generator 56 together with the sawtooth oscillator 50 provide a voltage controlled ultralinear sawtooth wave oscillator configuration, the voltage control input via path 58 of this configuration, as will be described in greater detail hereinafter, being utilized to control the operation of oscillator 50. Similarly, the constant current generator 62 and sawtooth oscillator 48 provide another ultralinear sawtooth waveform configuration in accordance with synchronizing signal input via path 60, the voltage control input via path 64 being utilized, as will be described in greater detail hereinafter, to control the operation of oscillator 48; such as the frequency of the output of sawtooth wave oscillator 48.

As was previously mentioned, capacitor 52 effectively determines the frequency of operation of sawtooth wave oscillator 48 and capacitor 54 effectively determines the frequency of operation of sawtooth wave oscillator 50. The output of sawtooth wave oscillator 50 is connected to a conventional emitter follower configuration 68 similar to that previously described with reference to the emitter followers 40 and 46 in which an NPN transistor 150 having an emitter 152, a base 154 and a collector 156, and a PNP transistor 158 having an emitter 160, a base 162 and a collector 164, for emitter follower 68, are operatively connected together, the emitter follower output of emitter follower configuration 68 being provided at point 164. Similarly, emitter follower configuration 70 which is operatively connected to the output of sawtooth wave oscillator 50 is preferably identical with emitter follower configuration 68, including NPN transistor 166 operatively connected to a PNP transistor 168, the emitter follower output of configuration 70 being provided at point 170.

VIDEO SWITCH

Figure 16:
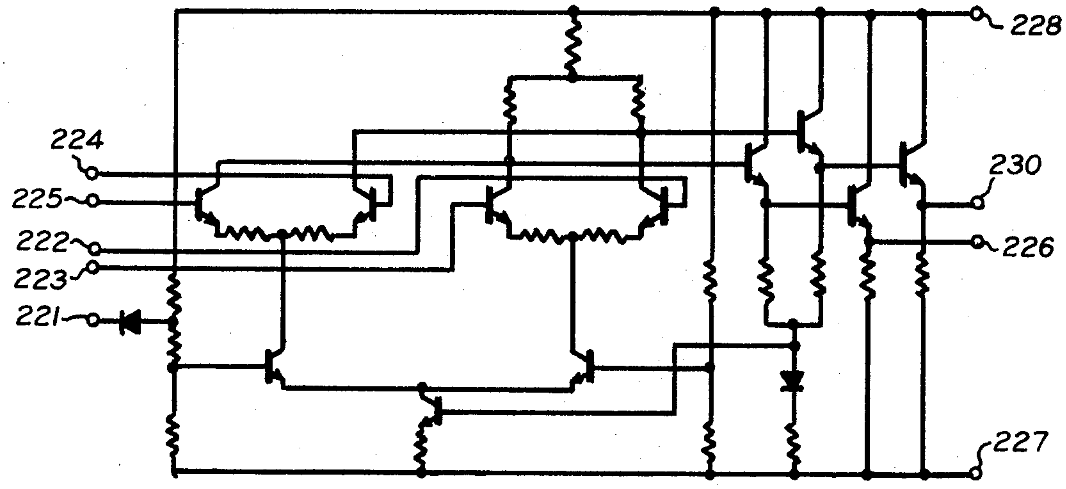
FIG. 16 is a schematic diagram of a typical integrated circuit gate controlled two-channel-input wideband amplifier such as utilized in FIG. 9.

Referring now to FIGS. 3, 9, 16 and 17 and describing the video switch portion 20 of the color video abstract synthesizer 10 in greater detail. The video switch configuration 20 is a conventional video switch configuration, and for purposes of illustration, preferably includes three independent video switch networks 172, 174 and 176, each network preferably including a saturation amplifier, 178 for network 172, 180 for network 174 and 182 for network 176, a gate controlled two-channel-input wideband amplifier integrated circuit utilized as a video switch, such as the type manufactured by Motorola Semiconductor under designation MC1445 and shown in greater detail in FIG. 16, video switch 184 being included in network 172, video switch 186 being included in network 174, and video switch 188 being included in network 176. The output of each of the respective video switchs 184 through 188, inclusive, is connected to an emitter follower configuration 190, 192, and 194, respectively. The saturation amplifiers 178, 180 and 182 are preferably identical linear integrated circuits such as the type manufactured by Motorola Semiconductor under the designation MC1709C and shown in greater detail in FIG. 17. Each of the saturation amplifiers 178, 180 and 182 has identical pin connections 201, 202, 203, 204, 205, 206, 207 and 208 which are operatively connected as shown with reference to FIGS. 9 and 17. The inputs to the saturation amplifier at points 210 and 212 for amplifier 178, 214 and 216 for amplifier 180, and 218 and 220 for amplifier 182 are preferably provided from the programming board 28 and, as will be explained in greater detail hereinafter, are preferably the outputs of the various pattern generators 12, 14, 16 and 18. As was previously mentioned, the video switches 184, 186 and 188 all preferably include identical integrated circuit configurations 185, 187 and 189 such as shown in FIG. 16 and manufactured by Motorola Semiconductor under the designation MC1445. The pin connections for video switches 185, 187 and 189 are preferably identical with respect to their associated saturation amplifiers 178, 180 and 182 and, for purposes of illustration, are designated as 221, 222, 223, 224, 225, 226, 227, 228, 229 and 230, FIGS. 9 and 16 being taken together to provide the detailed schematic of the respective video switch. With respect to video switch 185, points 232 and 234 represent the points of signal input to video switch 185; for video switch 187, points 236 and 238 represent the points of signal input; and for video switch 189, points 240 and 241 represent the points of signal input. It should be noted that the video switch configurations 185, 187 and 189 each include associated conventional resistor networks which will not be described in greater detail hereinafter.

As was previously mentioned, the outputs of the video switch configurations 184, 186 and 188 are operatively connected to low impedance conventional emitter follower configurations 190, 192 and 194, respectively, which are preferably similar to emitter followers 40 and 46 and will not be described in greater detail hereinafter. Suffice it to say that the output of the emitter follower configuration is provided at point 242 for emitter follower 190, 244 for emitter follower 192 and 246 for emitter follower 194. The output of the associated saturation amplifier 178, 180 and 182 is utilized to provide the switching states of the video switch configurations 184, 186 and 188, respectively, each video switch having two states. In one state, the video switch provides one video signal output, such as the signal supplied via point 232, and in the other state, the video switch provides the other video signal output, such as the signal provided at point 234. As will be described in greater detail hereinafter, preferably one of the two states of the video switch is the ground state, while the other state is the video signal input state, the operation of the video switch being conventional. The purpose of the resistor network associated with the respective video switch linear integrated circuit 185, 187 and 189 is to insure that the output corresponds to the desired signal range, which is preferably zero to +1 volt DC.

COLOR ENCODER

Figure 4:
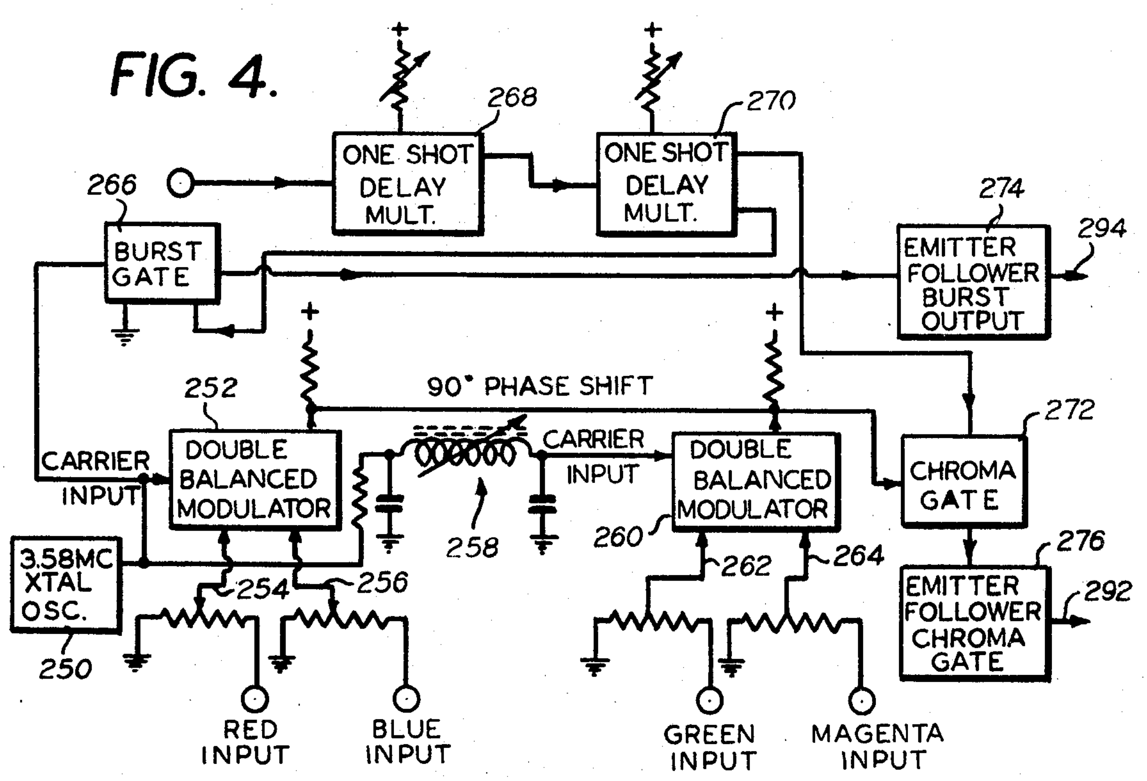
FIG. 4 is a more detailed block diagram of the color encoder portion of FIG. 1.
Figure 10:
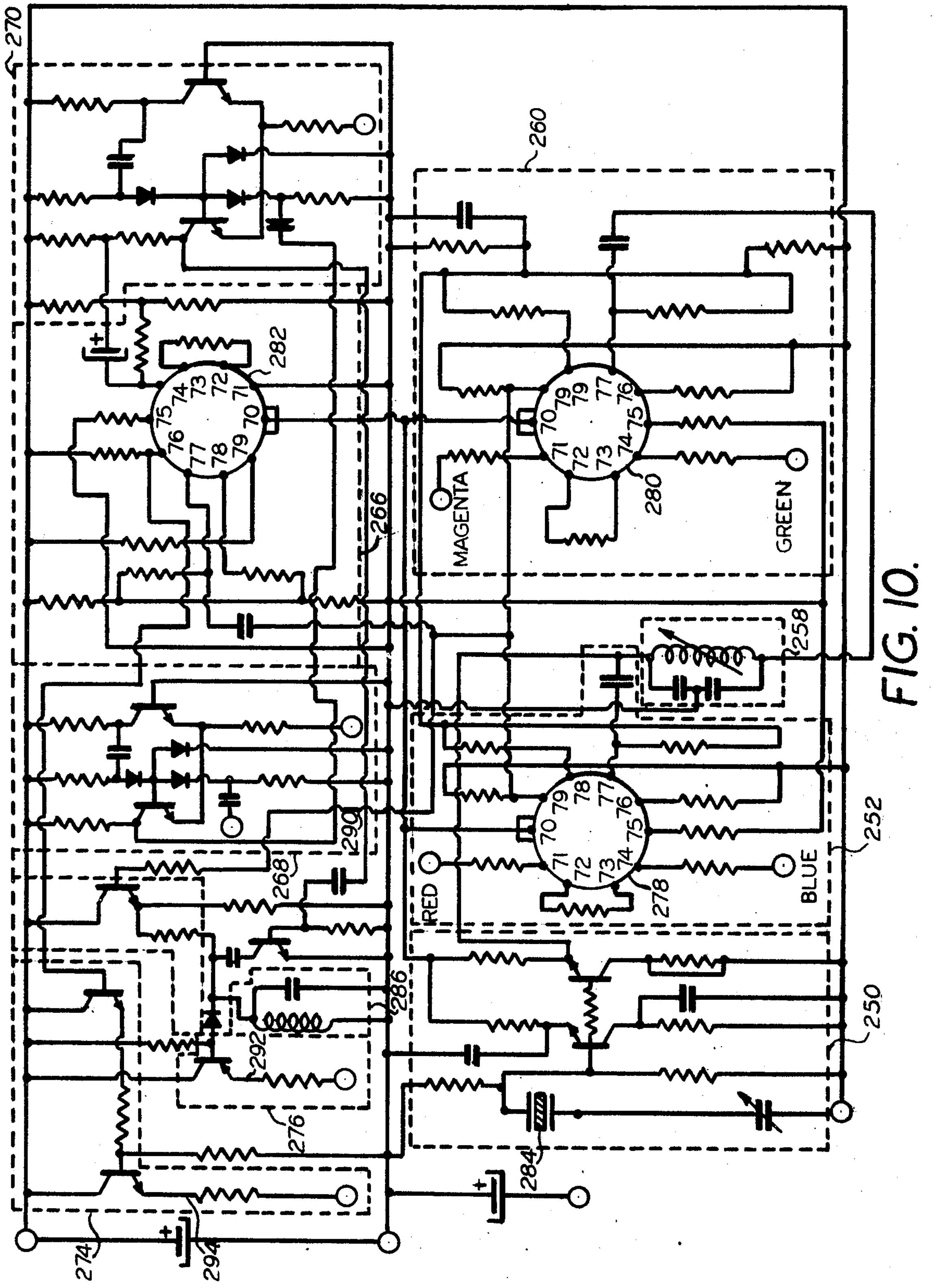
FIG. 10 is a schematic diagram of the circuit shown in FIG. 4.

Referring now to FIGS. 4, 10 and 15 and describing the color encoder portion 22 of the color video abstract synthesizer 10 in greater detail. The color encoder 22, as will be described in greater detail hereinafter, provides a pseudo chrominance signal having variable hue and saturation characteristics and is similar in structure and operation to a conventional color encoder utilized in a conventional color television system with the exception that, in a conventional system, an additional intermediate delay is utilized to produce the conventional I and Q signal phase relationship between the I and Q modulators. In the preferred encoder 22 of the present system only a 90° delay is introduced between the modulators. In addition, instead of true I and Q modulators, which operate in the range between cyan and orange, green and magenta, respectively, the encoder 22 utilized in the present invention, although utilizing a conventional type of Q modulator in that it operates in the range between green and magenta, utilizes a pseudo I modulator which operates in the range between red and blue which are color related to cyan and orange, in place of the conventional I modulator, the basic difference being that no intermediate delay is utilized to produce cyan and orange.

The color encoder 22 includes a conventional color subcarrier oscillator which is preferably a 3.58 megahertz crystal oscillator 250 which is connected to a conventional double balanced modulator configuration 252 whose two inputs are the red signal input via path 254 and the blue signal input via path 256. The subcarrier oscillator 250, which is directly connected to the carrier input of the double balanced modulator 252, is also connected in parallel through a conventional 90° phase shifter network 258 to the carrier input of another double balanced modulator 260, which is preferably identical in structure to modulator 252. The other inputs to modulator 260 are the green color signal input via path 262 and the magenta color signal input via path 264. As was previously mentioned, modulator 260 is equivalent to a conventional Q modulator and modulator 252 is a pseudo I modulator in that the color signal inputs are in the red to blue range as opposed to the cyan to orange range associated with a true I modulator. The output of the subcarrier oscillator 250 is also connected in parallel to a conventional burst gate 266 which functions in a conventional manner to provide a burst signal by gating out everything except for a signal having a pulse width equivalent to a conventional burst pulse.

The encoder 22 also includes a pair of single shot timing generators, which are preferably multivibrators 268 and 270. Timing generator 270 provides the burst pulse width and timing generator 268 provides a breezeway, which is the timing interval between the end of the horizontal sync pulse and the beginning of the burst pulse. Timing generators 268 and 270 are operatively connected to the burst gate 266 in order to control the operation of gate 266. Modulators 252 and 260 preferably have their outputs connected in parallel to the input of a conventional chroma gate 272, which is a gated mixer, to be described in greater detail hereinafter, for mixing the outputs of the modulators 252 and 260, the mixed outputs of modulators 252 and 260 providing a pseudo chrominance signal having a pseudo-saturation characteristic and pseudo-hue characteristic. The operation of chroma gate 272 is controlled by single shot timing generator 270. Preferably, the voltage swing for the chroma and burst signal is +0.5 volts peak to 0.5 volts peak providing a 1 volt peak-to-peak swing with zero volts as the center for chroma, and +0.2 volts peak to − 0.2 volts peak providing a 0.4 volt peak-to-peak swing with 0 volts as the center for burst. The output of burst gate 266 and of chroma gate 272 are each connected to a conventional emitter follower configuration 274 and 276, respectively, to provide emitter follower outputs therefrom of burst and chroma, respectively. It should be noted that, if desired, the self-contained subcarrier oscillator 250 of color encoder 22 could be disconnected from the system 10 and an external subcarrier oscillator utilized for operation of color encoder 22.

Referring now to FIG. 10, the double balanced modulator 252 and 260 preferably each include identical linear integrated circuits such as shown in FIG. 15 which are preferably similar to that manufactured by Fairchild Semiconductor under designation μa796, the associated pin numbers, for purposes of clarity, being identical to those previously designated. Preferably, burst gate 266 also includes a linear integrated circuit similar to Fairchild's μa796 as shown in FIG. 15 and the same pin numbers, for purposes of clarity, are utilized. As will be obvious to one with ordinary skill in the art, the pin connections utilized when the linear integrated circuit is utilized for burst gate 266 are different than those utilized when the linear integrated circuit shown in FIG. 15 is utilized as a double balanced modulator. For purposes of explanation, the linear integrated circuits utilized in modulators 252 and 260 are given reference numerals 278 and 280, respectively, and the linear integrated circuit utilized in burst gate 266 has been given reference numeral 282. The resistor network associated with linear integrated circuits 278 and 280 to provide the double balanced modulator functions for modulators 252 and 260 are conventional and will not be described in greater detail hereinafter. Similarly, the associated resistor and capacitive network for linear integrated circuit 282 which is utilized to provide the burst gate function is conventional and will not be described in greater detail hereinafter. The subcarrier oscillator 250 is a conventional crystal oscillator utilizing a conventional piezoelectric crystal 284 and will also not be described in greater detail hereinafter.

The outputs of modulators 252 and 260 are connected together so as to be mixed to provide a pseudo chrominance signal having hue and saturation characteristics. The mixed output is provided to chroma gate 272, which is a conventional chroma gate configuration which is connected across a tuned resonance circuit 286 whose function is to eliminate the harmonics associated with the outputs of modulators 252 and 260. If desired, tune resonance circuit 286 could be replaced by a filter network configuration. The outputs of modulator 252 and 260 are connected to conventional emitter follower configuration 276 via path 290, the output of emitter follower 276 being fed to tuned resonance circuit 286 which is set at the color burst frequency 3.58 megahertz. The chroma gate 272 which is connected across the tuned resonance circuit 286 preferably functions so that during the occurrence of the burst pulse the tuned resonance circuit 286 is shorted out so that no chroma output occurs during burst time. As was previously mentioned, control of the chroma gate 272 is provided by means of single shot network 270. Single shot timing generators 268 and 270 are conventional single shot network configurations employing an NPN transistor-diode network and will not be described in greater detail hereinafter. The emitter follower configuration 274 to which the output of the burst gage 266 is connected is also preferably a conventional emitter follower configuration and will not be described in greater detail hereinafter. Suffice it to say that the chroma output signal, which is the pseudo chrominance signal output of the color encoder 22, is provided at point 292 and the burst pulse output is provided al point 294.

VIDEO PROCESSING AMPLIFIER

The video processing amplifier portion 24 of the color video abstract synthesizer 10 is preferably a conventional video processing amplifier of the type which operates on a raw synthesized video signal to process the signal and provide a black level, blanking signal, burst signal and sync pulse in a composite video output signal which, as will be described in greater detail hereinafter, is the color video abstract signal which when passed to a conventional color television monitor 34 provides the resultant color video abstract display. The video processing amplifier 24 preferably includes a conventional keyed clamping circuit 300, labeled DC restorer keyed, with functions in a conventional manner to establish a DC reference potential every horizontal line of video and functions to establish a black reference for the video signal prior to blanking and synch insertion; a conventional sync separator 302 which is preferably DC coupled from the clamping circuit 300, the sync separator 302 functioning to provide a sync pulse via path 304, the sync level being adjustable by means of potentiometer 306, and a blanking pulse via path 308 through an emitter follower 310; and a composite blanking generator 312 connected to the output of emitter follower 310, blanking generator 312 functioning in a conventional manner to provide a horizontal blanking signal via path 314 and the composite blanking signal via path 316. The horizontal blanking signal via path 314 is provided to the keyed clamping circuit 300 so that clamping may be accomplished during the period coincident with the horizontal blanking signal so that the blanking signal, once it is applied, will obscure any disturbing effects that might occur during the actual clamp operation. In this manner the video is clamped to its reference DC at the end of each horizontal interval.

Figure 5:
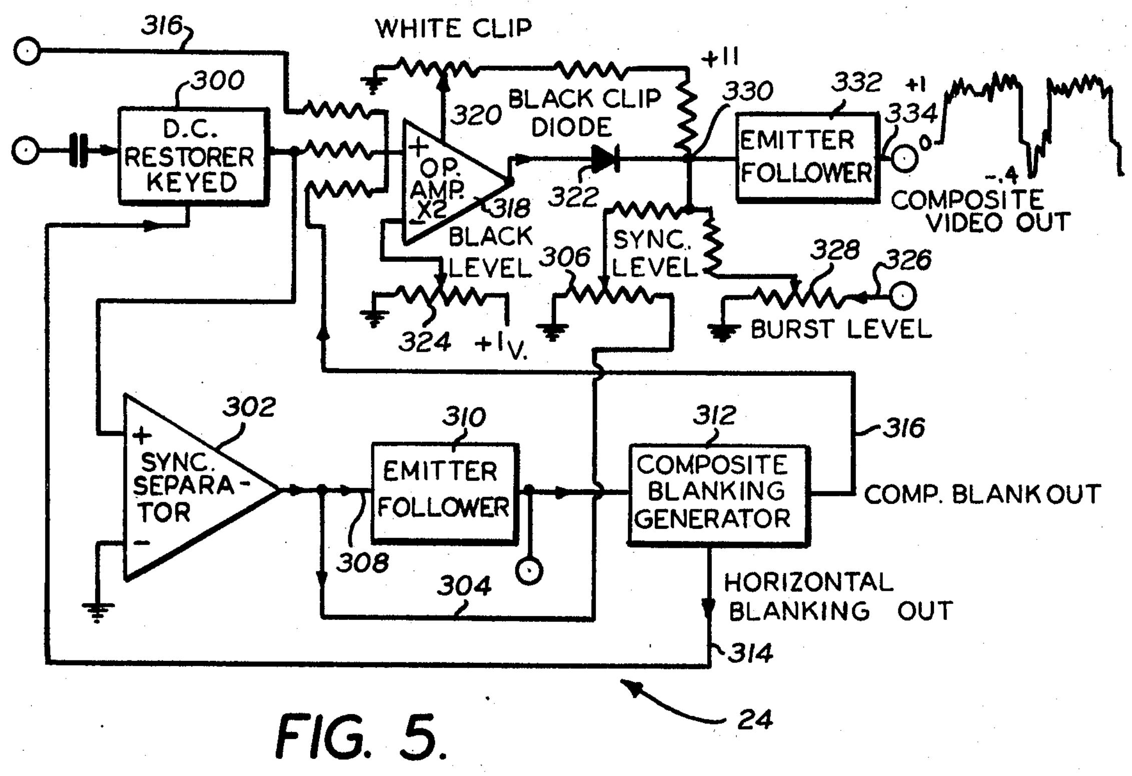
FIG. 5 is a more detailed block diagram of the video processing amplifier portion of FIG. 1.

The raw synthesized video signal is input via path 317 to a conventional linear integrated circuit 318 represented by an operational amplifier in FIG. 5, such as of the type manufactured by RCA Semiconductor under the designation CA3028A. The operational amplifier configuration 318 functions in a conventional manner so as to provide white peak clipping and black peak clipping, the white peak clipping eliminating high amplitude signal excursions, the white peak clipping level being determined by means of potentiometer 320. Diode 322 associated with the output of operational amplifier 318 is the black clip diode. The black level is preferably determined by means of potentiometer 324. The burst signal is preferably input to video processing amplifier 24 via path 326. The burst level is preferably determined by means of potentiometer 328. The sync signal, burst signal, blanking signal, and synthesized video signal, now having a predetermined black level, are mixed together at point 330 from where they are passed to a conventional emitter follower configuration 322 to provide the composite color video abstract signal via path 334.

Figure 11:
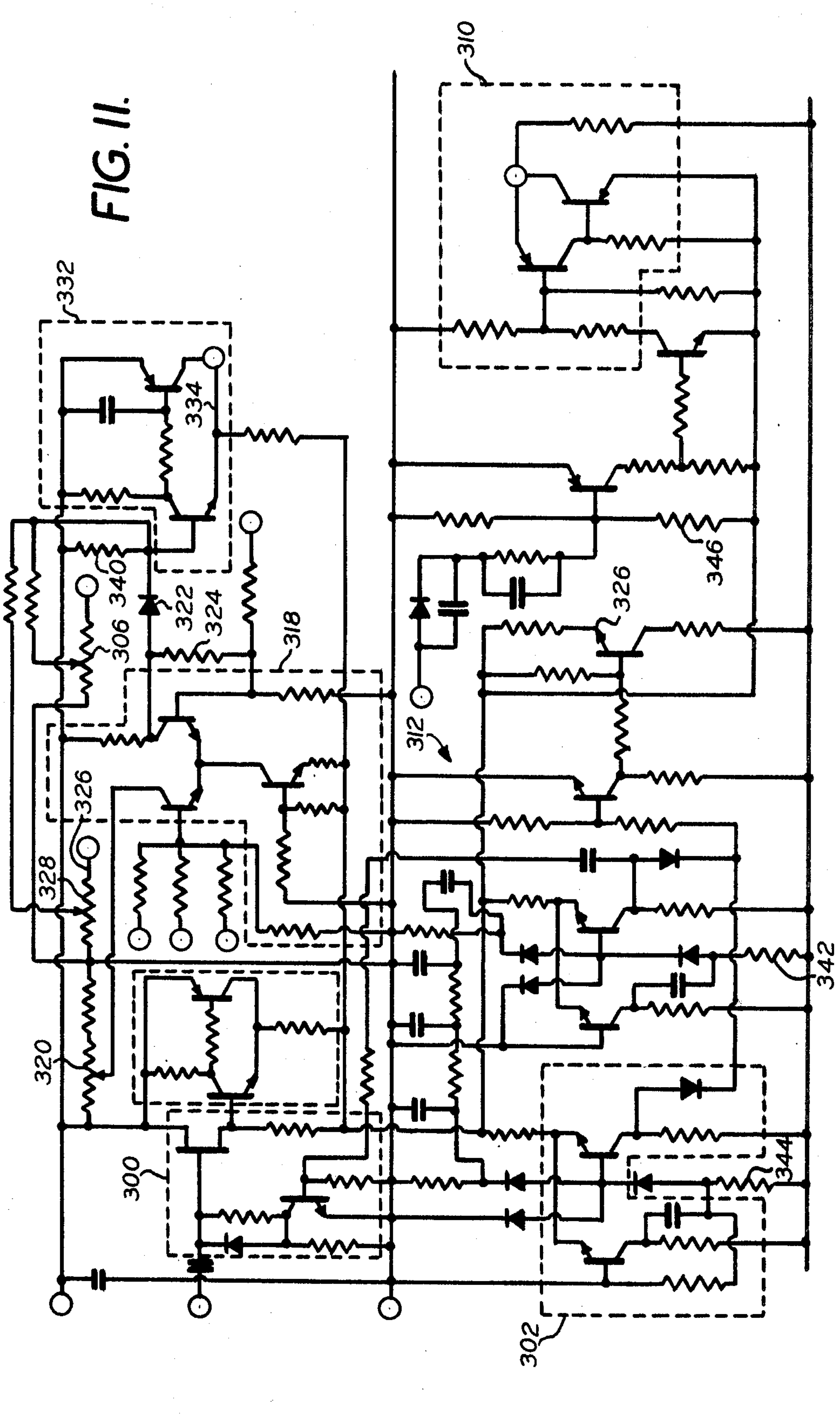
FIG. 11 is a schematic diagram of the circuit shown in FIG. 5.

Referring now to FIG. 11, emitter follower 332 is preferably a conventional emitter follower configuration similar to emitter followers 40 and 46 and will not be described in greater detail hereinafter. An impedance 340 preferably determines the zero center line for the composite video signal output of emitter follower 332 provided via path 334. For purposes of clarity, the sync separator portion of circuit 302 of FIG. 11 is generally indicated as is the emitter follower portion 310 which is conventional. The balance of the associated detailed schematic circuitry is associated with the composite blanking generator 312 and is conventional and will not be described in greater detail hereinafter. Suffice it to say that impedance 342 preferably determines the horizontal blanking back porch width and impedance 344 preferably determines the vertical blanking back porch width for the blanking signal. Impedance 346 is associated with the sync separation circuitry 302 and preferably determines the best sync separation with the lowest possible video input signal. The detailed schematic of FIG. 11 is essentially conventional for a conventional video processing amplifier which processes a raw synthesized video signal to provide a composite video output signal having a black level, blanking signal, burst signal and sync pulse and will, therefore, not be described in greater detail hereinafter.

FIXED PATTERN GENERATOR AND POSITION NETWORK

Figure 6:
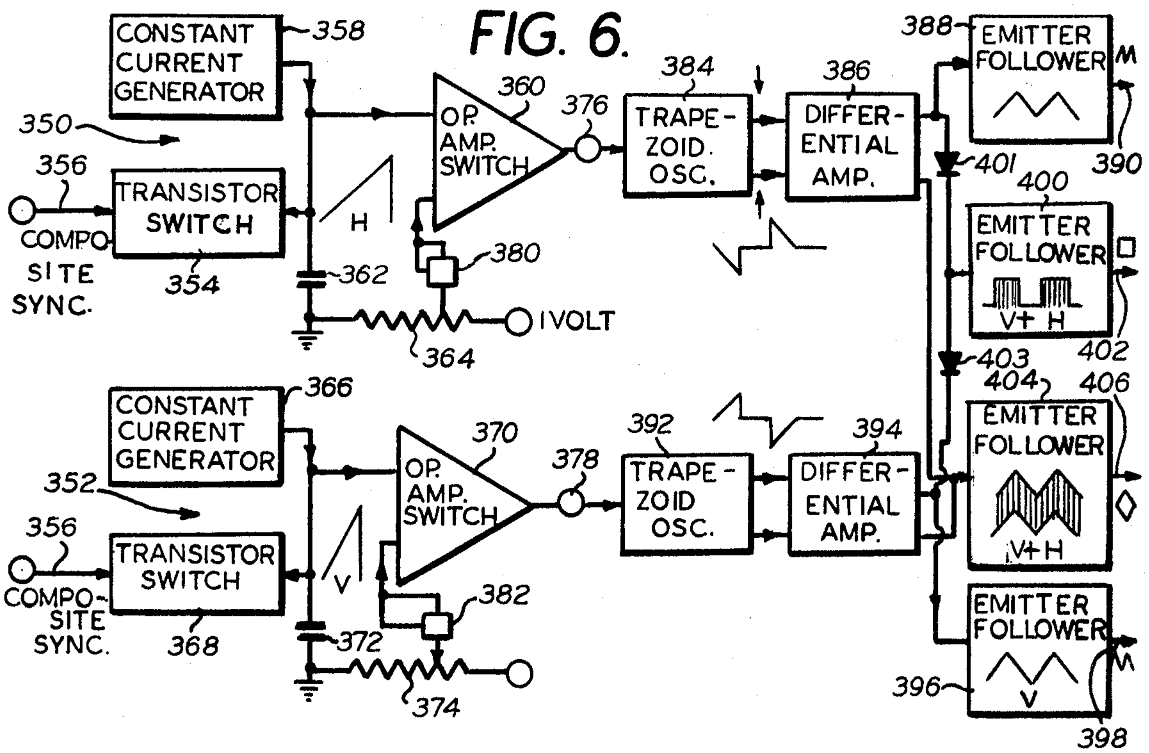
FIG. 6 is a more detailed block diagram of the pattern position and fixed pattern generation circuitry portion of FIG. 1.
Figure 12:
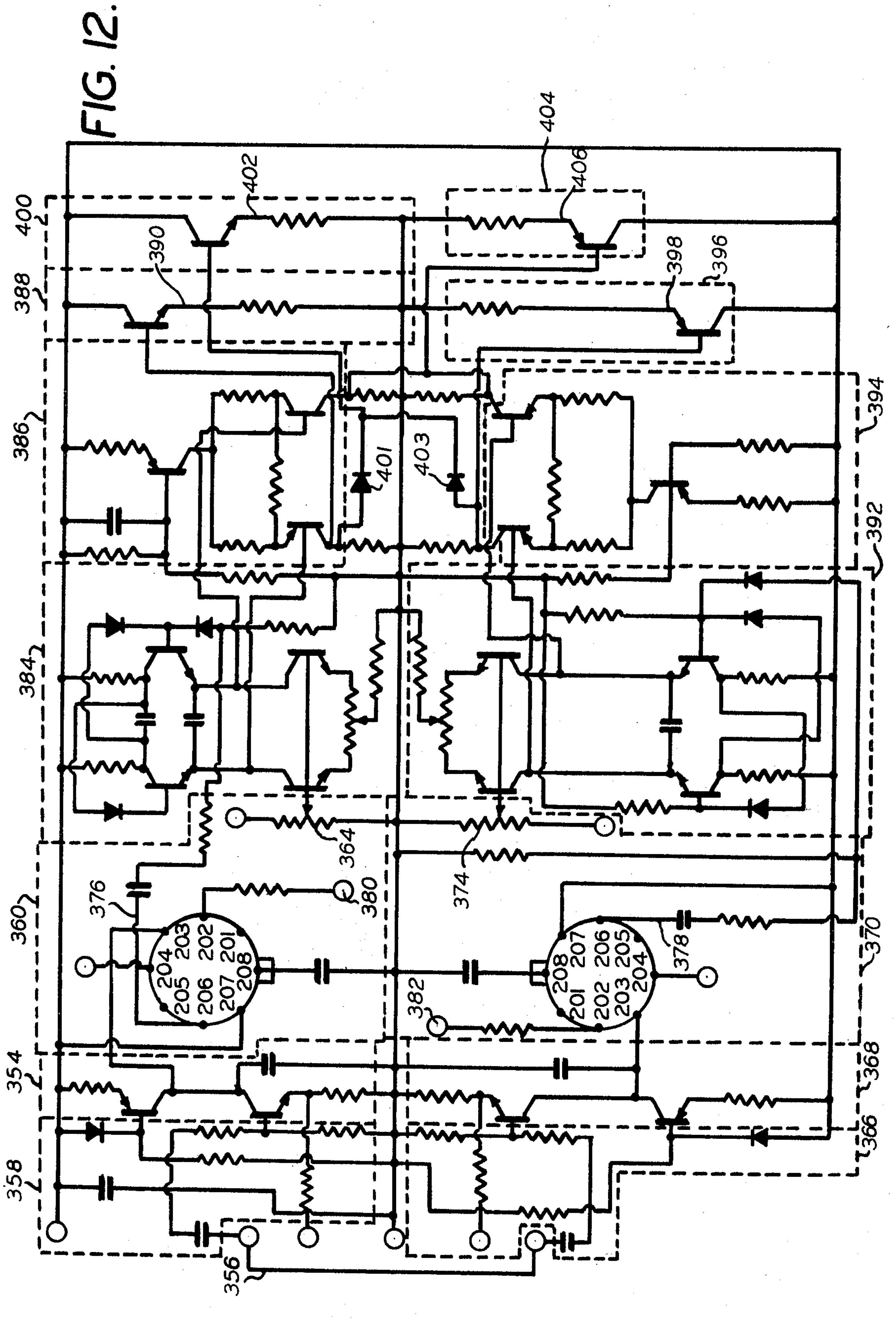
FIG. 12 is a schematic diagram of the circuit shown in FIG. 6.
Figure 17:
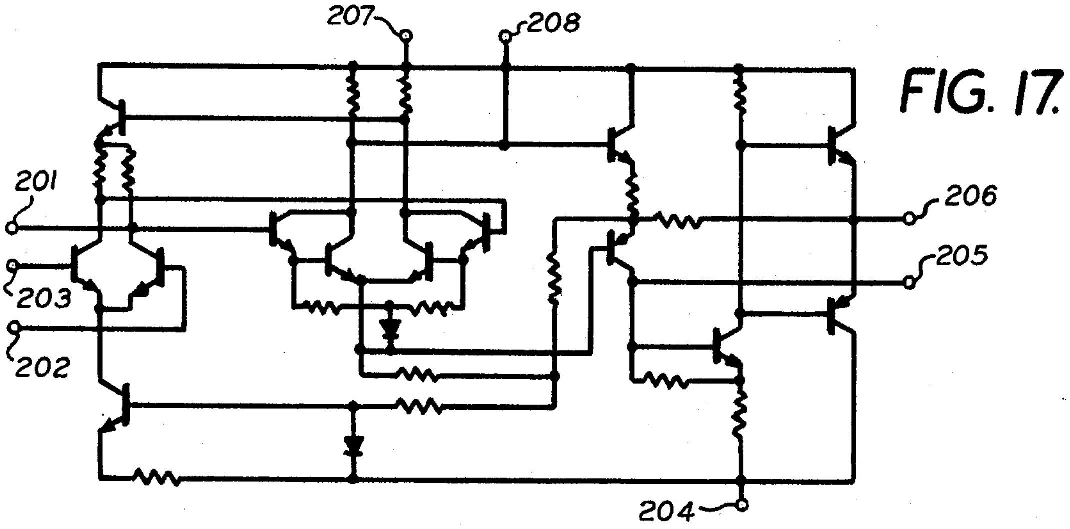
FIG. 17 is a schematic diagram of a typical operational amplifier integrated circuit such as utilized in FIGS. 9, 12, 13 and 14.

Referring now to FIGS. 6, 12 and 17 and describing in greater detail the fixed pattern generator and position network 18 portion of the color video abstract synthesizer 10. The fixed pattern generator and position network 18 preferably includes a horizontal sync pulse circuit, generally indicated by reference numeral 350, and a vertical sync pulse circuit, generally indicated by reference numeral 352. These circuits are so named due to the associated pulse width of the resultant sawtooth waveform produced in a manner to be described in greater detail hereinafter. The horizontal sync pulse circuit 350 preferably includes a conventional constant current generator 358 operatively connected in parallel to a conventional transistor switch 354 through which the composite sync signal is input via path 356 to differentiator circuit 355–357 to provide a sawtooth waveform having a pulse width equivalent to the horizontal pulse width. A DC signal is fed to one input of a conventional operational amplifier switch 360 through a wiper arm 363 of a left-right pattern control potentiometer 364, the sawtooth waveform being fed to the other input of operational amplifier switch 360. The output of the operational amplifier switch 360 is a rectangular waveform having a pulse width determined by the selected pickoff point of the sawtooth waveform, the pickoff point being set at a given value along the sawtooth waveform by means of a potentiometer 364.

Similarly, for the vertical sync pulse circuit 352, preferably a conventional constant current generator 366 is operatively connected to another conventional transistor switch 368 through which the composite sync signal is input via path 356 and integrator circuit 359–361 to provide a sawtooth waveform having a pulse width equivalent to the vertical sync pulse width. A DC signal is fed to one input of another operational amplifier switch 370 through a wiper arm 372 of an up-down pattern control potentiometer 374, the sawtooth waveform being fed to the other input of operational amplifier switch 370. The output of the operational amplifier switch 370 is another rectangular waveform having a pulse width determined by the selected pickoff point of the sawtooth waveform determined by the setting of potentiometer 374. These rectangular waves are locking pulses provided at points 376 and 378, respectively, the a locking pulse provided at point 376 being the horizontal locking sync pulse and the locking pulse provided at 378 being the vertical locking sync pulse.

As will be described in greater detail hereinafter, these locking pulses are in turn fed to the pattern generators as a sync signal for locking the patterns so that they are stable rather than mobile so as to eliminate drifting of the pattern on the display screen; in other words, the pattern will then be locked in one position on the screen. The voltage which is input through the operational amplifier switches 360 and 370 at points 380 an 382, respectively, determines which position on a display screen the particular pattern will be locked into. In this manner, the voltages input at points 380 and 382 are the centering controls for the pattern on the screen, the voltage input at point 380 determining the horizontal position on the screen and the voltage input at point 382 determining the vertical position on the screen. If desired, a DC voltage can be fed to points 380 and 382 in order to lock the associated pattern in a given position on the screen or an oscillator input may be fed to points 380 and 382, in which instance the associated pattern generators would be synced to this oscillating signal so as to provide a moving pattern at the frequency of the oscillator input. In such an instance, the pattern exhibits planar movement on the screen such as up or down, and left or right, as opposed to an in/out zoom effect or pulsating movement which is preferably provided by providing an oscillator input to the saturation amplifiers 178, 180 and 182 of video switch 20 instead of a DC input signal, this oscillating input being applied to points 210 and 212 for amplifier 178, points 214 and 216 for amplifier 180 and points 218 and 220 for amplifier 182. If a DC input signal is provided to saturation amplifiers 178, 180 and 182, no zoom effect occurs.

The output of operational amplifier 360 is also input to a conventional trapezoid waveform oscillator 384 whose output is, in turn, connected to a conventional differential amplifier 386. The output of differential amplifier 386 is a triangular waveform at the horizontal pulse width (associated with the horizontal scanning signal) and is passed through a conventional emitter follower 388 to provide this triangular waveform at point 390. Similarly, the output of operational amplifier 370 is also fed to another conventional trapezoid waveform oscillator 392 whose output is, in turn, fed to a conventional differential amplifier 394 to produce a triangular waveform having the vertical pulse width (associated with the vertical scanning signal), which waveform is passed through a conventional emitter follower configuration 396 to provide this triangular waveform at points 398. In addition, the triangular waveform outputs of differential amplifiers 386 and 394 are differentially mixed, that is, non-additively, and passed through a conventional emitter follower configuration 400, the output of differential amplifier 386 being connected to emitter follower 400 through a diode 401 and the output of differential amplifier 394 being connected to emitter follower 400 through another diode 403, diodes 401 and 403 being operatively connected together with the input to emitter follower 400 in back-to-back fashion. The output of emitter follower configuration 400 is a complex waveform provided at point 402 which when passed through an associated video switch provides a square geometric form characteristic for a resultant color video abstract display. Similarly, the outputs of differential amplifiers 386 and 394 are also additively mixed to provide a complex waveform which s passed to another conventional emitter follower configuration 404 whose output at point 406 is a complex waveform which when passed through an associated video switch provides a diamond geometric form characteristic for the resultant color video abstract display.

Referring now to FIG. 12, the operational amplifier switches 360 and 370 are preferably linear integrated circuits such as the type manufactured by Motorola Semiconductor under designation MC1709C and shown in greater detail in FIG. 17, identical pin numbers being utilized in FIGS. 12 and 17 for the appropriate pin connections. It should be noted that operational amplifier switches 360 and 370, in addition to the respective linear integrated circuit include conventional associated resistor-capacitor networks for providing the operational amplifier switching function and will not be described in greater detail hereinafter.

The details of the balance of the associated circuitry shown in FIG. 12 for purposes of clarity are conventional and will not be described in greater detail hereinafter.

MULTIPLE WAVEFORM CONFIGURATION PATTERN GENERATORS 12 AND 14

Figure 7:
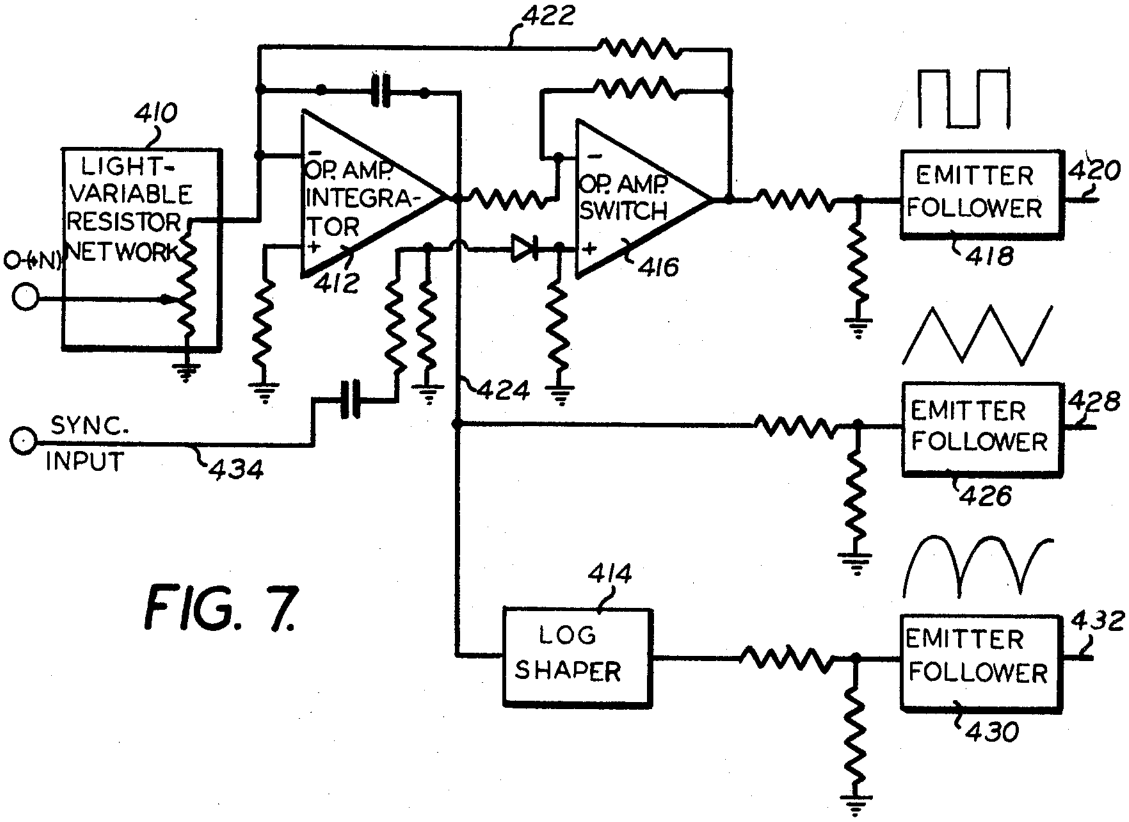
FIG. 7 is a more detailed block diagram of a typical multiple pattern generator portion of FIG. 1.
Figures 13, 14A, 14B:
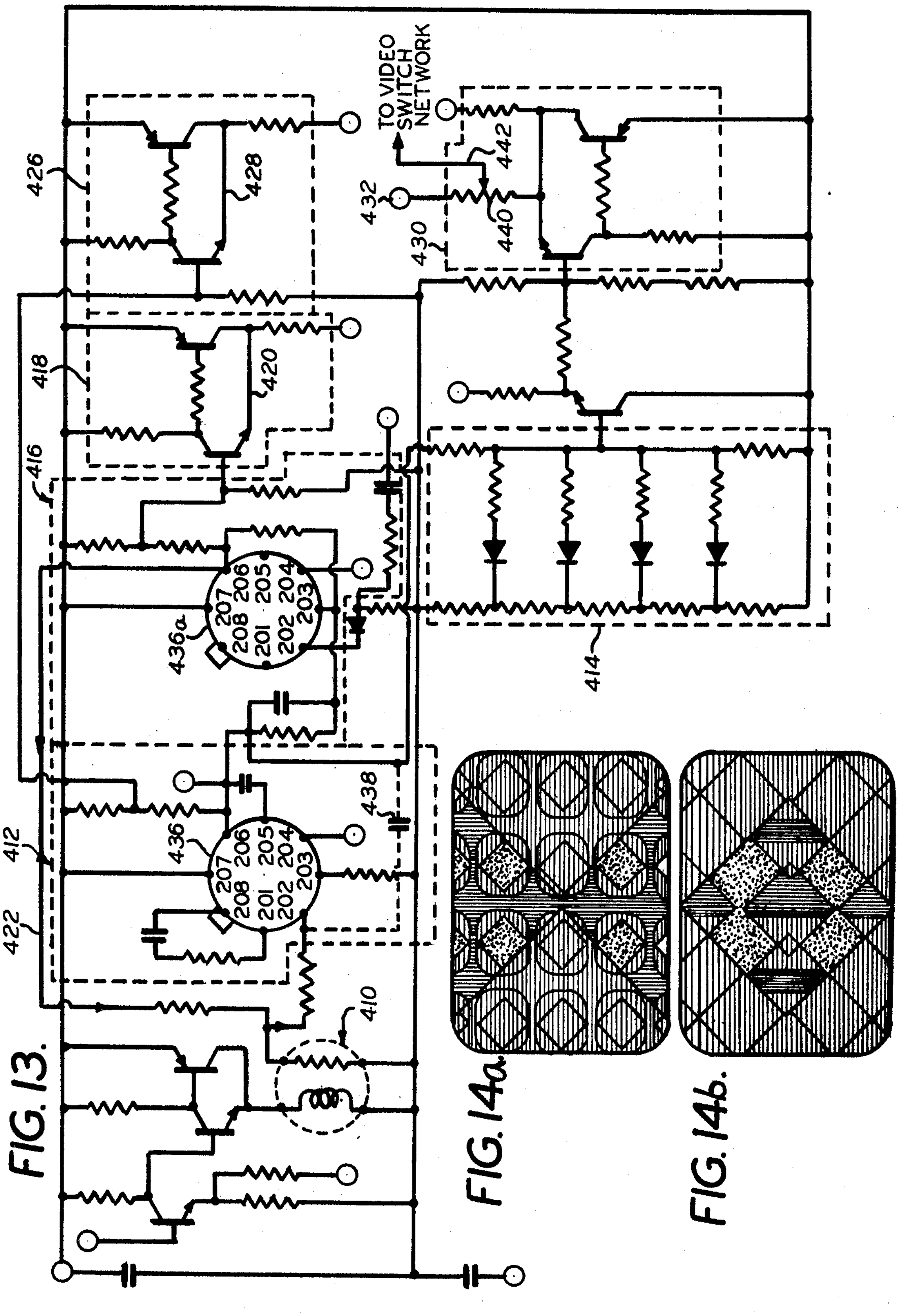
FIG. 13 is a schematic diagram of the circuit shown in FIG. 7.
FIGS. 14*a* and 14*b* are diagrammatic illustrations exemplary of color video abstract displays produceable by the system of FIG. 1.

Referring now to FIGS. 7, 13 and 17 and describing the multiple waveform pattern generators 12 and 14 in greater detail. Preferably, the associated circuitry for pattern generators 12 and 14 is substantially identical except for the two distinctions to be noted hereinafter, the primary difference in operation being the pattern generator 12 has a frequency of operation preferably in a range between a value which is slightly below the horizontal frequency rate to substantially above this rate, such as a range of preferably between 8 and 75 kilocycles where the horizontal frequency rate is 15 kilocycles, and the rate of operation of pattern generator 14 is a range preferably substantially below the vertical frequency rate to substantially above this rate, such as, for example, a range of preferably one cycle per 2 to 8 kilocycles where the vertical frequency rate is 60 cycles per second. The operation of pattern generators 12 and 14 is therefore, preferably identical, the only difference being the frequency of operation, pattern generator 12 being fed the horizontal sync pulse output from point 376 of the operational amplifier 360 of pattern generation circuitry 18, and pattern generator 14 being fed the vertical sync pulse output from point 378 of the operational amplifier 370 of pattern control circuitry 18. For purposes of explanation, the horizontal sync pattern generator 12 will be described in greater detail with the differences present in the vertical sync pattern generator 14 being specifically enumerated.

Patter generator 12 preferably includes a conventional light variable resistor network 410; a conventional operational amplifier integration network 412 whose output is connected in parallel to a conventional log shaper network 414 and to one input of a conventional operational amplifier witch 416 whose output is, in turn, connected in parallel to a conventional emitter follower configuration 418 to provide a square wave output at point 420, and in a feedback path 422 through a resistor to provide a feedback input for integrator 412 thereby creating a triangular waveform output. This triangular waveform is fed via path 424 to a conventional emitter follower 426 to provide a triangular waveform output at point 428, and to the log shaper 414, which is a conventional resistor-diode shaping network which rounds the peaks of the triangular waveform to provide a parabolic waveform. The output of shaper 414 is passed through another emitter follower configuration 430 to provide a parabolic waveform output at point 432. The sync input for the pattern generator 12 is provided via path 434 to the operational amplifier switch 416. As was previously mentioned, the sync input for pattern generator 12 via path 434 is provided from point 376 of pattern control circuitry 18 and the sync input via path 434 for pattern generator 14 is provided from point 378 of pattern control circuitry 18. Thus, a squarewave output at point 420, a triangular waveform output at point 428, and a parabolic waveform output at point 432 are provided from the pattern generator 12 or 14, these waveforms being at the horizontal rate determined by the signal supplied from point 376 for pattern generator 12, and at the vertical rate determined by the signal supplied from point 378 for pattern generator 14.

Referring now to FIGS. 13 and 17. The operational amplifier integrator associated with pattern generator 12 includes a linear integrated circuit preferably of the type manufactured by Motorola Semiconductor under the designation MC1709C and shown in greater detail in FIG. 17, the identical pin numbers being utilized in FIGS. 17 and 13. In addition, the integrator formed by the linear integrated circuit 436 includes a capacitor 438 connected in parallel between pins 204 and 206. It should be noted that capacitor 438 is not utilized in pattern generator 14 and for this reason is shown by dotted lines. The operational amplifier switch 416 is also preferably a linear integrated circuit identical to that utilized for the operational amplifier integrator 412 and is designated by reference numeral 436*a*. The emitter follower configurations 418, 426 and 430 are conventional emitter follower configurations and will not be described in greater detail hereinafter. Similarly, the light variable resistor network 410 is a conventional network which changes the frequency of the triangular waveform in accordance with variations in the amplitude of the square wave output which is fed back along path 422. The log shaper network 414, as was previously mentioned, is a conventional resistor-diode shaping network which rounds the peaks of the triangular waveform to provide a parabolic waveform to emitter follower configuration 430 whose output at point 432 is the parabolic waveform. The output of emitter follower configuration 430 is preferably connected to the identical output point for the parabolic waveform output of pattern generator 14 through a vanable potentiometer 440 associated with program board 28 if it is desired to provide a circular pattern having a variable aspect ratio, the potentiometer 440 having a wiper arm 442 connected to an associated switch in the video switch network 20 in order to change the circular pattern from a circle to an ellipse having any desired foci by moving wiper arm 442 to change the associated impedance. As was previously mentioned, the circuitry associated with pattern generator 14 is identical except for the absence of capacitor 438. The balance of the associated circuitry is conventional and will not be described in greater detail hereinafter.

OPERATION

For purposes of explanation, the operation of this system with one typical preferred program interconnection via program board 28 will be described, although any desired number of different program interconnections may be made by rewiring program board 28 or by electronically changing the program, the following example being by way of illustration and not limitations. In a preferred typical program interconnection, the outputs of the video switch network 20 are connected to the inputs of the color encoder 22; the sawtooth generators from pattern generator 16 are connected to the video switch 20 to provide a strobe effect to the outputs of pattern generators 18, 12 and 14; the various pattern generators are connected to the video switch and also to the video processing amplifier whose output in turn is provided to a color television monitor 34. More specifically, a typical preferred program interconnection capable of producing the color video abstract displays illustrated in FIGS. 14*a* and 14*b* wherein FIG. 14*a* is similar to FIG. 14*b* the primary difference being that the frequencies of the vertical and horizontal oscillators associated with the display of FIG. 14*a* is higher than those associated with FIG. 14*b* and the pattern of FIG. 14*b* is shifted vertically to one extreme in FIG. 14*a*, is as follows. Point 282 of the emitter follower 276 associated with chroma gate 272 is connected to path 317 of video processing amplifier 24; point 242 associated with the output of emitter follower 190 of the video switch 20 is connected to the red input of the color encoder 22; point 244 associated with the output of emitter follower 192 of the video switch 20 is connected to the blue input of the color encode 22; point 246 associated with the output of emitter follower 194 of video switch 20 is connected to the green input of the color encoder 22; point 406 associated with the output of emitter follower 404 of the pattern control network 18 is connected to input point 210 of operational amplifier 178 of video switch 20; the wiper arm 500 of a potentiometer 502 (FIG. 9) associated with program board 28 is connected to point 214 associated with integrated circuit 180 of video switch 20; one end 504 of potentiometer 500 is connected to point 428 associated with the output of emitter follower 426 of vertical multiple pattern generator 12, the other end 506 of potentiometer 500 being connected to point 428 associated with the output of emitter follower 426 of horizontal multiple pattern generator 14; the wiper arm 508 of a potentiometer 510 (FIG. 9) associated with program board 28 is connected to point 218 associated with integrated circuit 182 of video switch 20; one end 512 of potentiometer 510 is connected to point 420 associated with the output of emitter follower 418 of vertical multiple pattern generator 12, the other end 514 being connected to point 432 associated with the output of emitter follower 430 of horizontal multiple pattern generator 14; point 212 associated with the input to operational amplifier 178 of video switch 172 is connected to output point 170 of emitter follower 70 of sawtooth pattern generator 16; point 216 associated with the input to operational amplifier 180 of video switch 174 is connected to output point 164 of emitter follower 68 of sawtooth pattern generator 16; and point 220 associated with the input to operational amplifier 182 of video switch 176 is connected to the wiper arm 516 of a potentiometer 518 associated with program board 28, one end of potentiometer 518 being connected to ground, the other end preferably being connected to + 1 volt D.C. This program interconnection produces a display similar o FIGS. 14*a* and 14*b* wherein the portions of the display controlled by oscillator zoom in and out, the display having red, blue and green areas and an additive overlay portion which is a mixture of the overlayed colors. In this manner a color video abstract display wherein the patterns are strobed from negative to positive and vice versa is provided. The color of the video abstract display is determined by the color encoder 22 which provides the chroma signal, which is a pseudo chrominance signal whose hue and saturation characteristics ma be varied in order to vary the color video abstract color content. The geometric form characteristic associated with the color video abstract display is determined by the interconnection of the outputs of pattern generators 12, 14 and 18, and may be any of a multiplicity of forms such as a diamond, a square, a circle having a variable aspect ratio capable of providing a circle or an ellipse of any desired foci, a triangle, a parabola, a squarewave, or any mixture thereof. The particular geometric form characteristic present in the display is dependent on the interconnection of the pattern generators 12, 14 and 18 which interconnection is programmed on program board 28. In addition, keyboard 30 may be operated to modify these interconnections or to provide additional interconnections to vary the color video abstract display geometric form characteristic or, if so programmed, to vary the color content characteristic either separately or in conjunction therewith.

The detailed operation of each of the portions comprising the color video abstract synthesizer have previously been described with reference to the details of the circuitry and will not be describe again. Suffice it to say that pattern generators 12 and 14 preferably each produce three different patterns which are a triangular wave, a squarewave and a parabolic wave; pattern generator 18 produces a horizontal sync locking signal for pattern generator 12 and a vertical sync locking signal for sync control of pattern generator 14, as well as the triangular waveform associated with the horizontal signal, a triangular waveform associated with the vertical signal, and a complex waveform which when passed through the video switch results in a square geometric form or a diamond geometric form; pattern generator 16 produces a sawtooth waveform which may be utilized to strobe pattern generators 12, 14 and 18; color encoder 22 provides a chroma signal and burst signal, the chroma signal being a pseudo chrominance signal resulting from the mixture of the three primary colors, red, blue and green, as well as the color magenta; and the video processing amplifier 24 operates in a conventional manner to produce the composite video color abstract signal, the programming board 28 being hardwired to interconnect these various devices 12 through 24, inclusive, in any desired fashion so as to produce a predetermined color video abstract signal having predetermined color content and geometric form characteristics, which signal provides the particular associated video color abstract on a color television monitor 34.

Preferably the keyboard 30 is operatively connected to the program board 28 so that each key has a particular associated pre-wired program to produce a particular change in the color video abstract which change is present as long as the key is depressed and is therefore intermittent. As was previously mentioned, by providing an oscillator input to video switch 20, a zoom in and out effect could be provided for the resultant color video abstract display. By providing an oscillator input for points 380 and 382 of pattern control circuitry 18, planar movement on the screen can be provided for the video abstract display, up or down movement being provided by feeding an oscillator input to point 382 and left or right movement being provided by feeding an oscillator input to point 380. Therefore, by controlling various inputs throughout the synthesizer 10 by means of the program board 28 and keyboard 30, as well as additional controls if desired, any desired color video abstract display can be produced in which the color content and geometric form of the display can be varied in a predetermined fashion. For purposes of illustration, two color video abstract displays produceable with the synthesizer 10 of the present invention are shown by way of example in FIGS. 14*a* and 14*b*.

It is to be understood that the above described embodiment of the invention is merely illustrative of the principles thereof and that numerous modifications and embodiments of the invention may be derived within the spirit and scope thereof.

What is claimed is:

1. An apparatus for synthesizing an originally generated composite color video abstract input signal for display on a color television monitor means, said composite signal having a selectable color content characteristic and a selectable geometric form characteristic in said display, said apparatus comprising:

pattern generation means for providing at least two original signals having predetermined waveform configurations, said waveform configurations being capable of combining to provide a complex waveform configuration as said video display, said complex waveform having a different geometric form characteristic than said original signals;

color encoder means for providing a pseudo chrominance signal from at least two different color signals, said pseudo chrominance signal having controllably variable pseudo hue and pseudo saturation characteristics, said color content characteristic being dependent on said pseudo hue and saturation characteristics; video switch means for mixing said original signals to provide a resultant signal having said complex waveform configuration; and means operatively connected to said pattern generation means, said color encoder means and said video switch means for controllably selecting and mixing said pseudo chrominance signal and said resultant signal having said complex waveform configuration in order to provide said synthesized color video abstract signal with a predetermined color content characteristic and geometric form characteristic when displayed on said color television monitor means

2. An apparatus in accordance with claim 1 wherein said controllable mixing and selecting means includes means for controllably varying at least one of said characteristics to change said color video abstract signal characteristics by varying at least said pseudo chrominance signal or said resultant signal.

3. An apparatus in accordance with claim 2 wherein said controllable varying means comprises means for intermittently controllably varying at least one of said characteristics while said synthesized signal is being displayed on said color television by intermittently varying at least said pseudo chrominance signal or said resultant signal.

4. An apparatus in accordance with claim 3 wherein said intermittent control means comprises means for intermittently controllably varying both of said characteristics while aid synthesized signal is being display on said color television monitor means.

5. An apparatus in accordance with claim 1 wherein said apparatus includes means for providing a horizontal synchronizing signal at a predetermined frequency, said pattern generation means including means for providing at least one of said signals having a predetermined waveform configuration at a frequency which is at least a sub-multiple of said horizontal synchronizing signal frequency.

6. An apparatus in accordance with claim 1 wherein said apparatus includes means for providing a vertical synchronizing signal at a predetermined frequency, said pattern generation means including means for providing at least one of said signals having a predetermined waveform configuration at a frequency which is at least a submultiple of said vertical synchronizing signal frequency.

7. An apparatus in accordance with claim 1 wherein said apparatus includes means for providing a control signal at a predetermined frequency, said video switching means being operatively connected to said control signal providing means in order to provide said color video abstract signal with a variable intensity, said intensity varying in accordance with said predetermined control frequency so as to provide a video display having a zoom characteristic.

8. An apparatus in accordance with claim 1 wherein said color video abstract signal provides a color video abstract display having a predetermined display position on a screen, and said apparatus further includes means for controlling the position of said abstract display.

9. An apparatus in accordance with claim 1 wherein said pattern generation means comprises means for generating at least a pair of triangular waveform configurations and means for differently mixing said triangular waveform configurations to provide said complex waveform configuration, said controllable mixing means including means for providing a square geometric form characteristic for said color video abstract signal.

10. An apparatus in accordance with claim 9 wherein said apparatus includes means for providing a horizontal synchronizing signal and a vertical synchronizing signal at different predetermined frequencies, said pattern generation means including means for generating at least one of said pairs of triangular waveform configurations substantially at said horizontal synchronizing signal frequency and said other one of said pair of triangular waveform configurations substantially at said vertical synchronizing signal frequency.

11. An apparatus in accordance with claim 1 wherein said pattern generation means comprises means for generating at least a pair of triangular waveform configurations and means for additively mixing said triangular waveform configurations to provide said complex waveform configuration, said controllable mixing means including means for providing a diamond geometric form characteristic for said color video abstract signal.

12. An apparatus in accordance with claim 11 wherein said apparatus includes means for providing a horizontal synchronizing signal and a vertical synchronizing signal at different predetermined frequencies, said pattern generation means including means for generating at least one of said pair of triangular waveform configurations substantially at said horizontal synchronizing signal frequency and said other one of said pair of triangular waveform configurations substantially at said vertical synchronizing signal frequency.

13. An apparatus in accordance with claim 1 wherein said pattern generation means comprises means for generating at least a pair of parabolic waveform configurations to provide said complex waveform configuration, said controllable mixing means including means for providing an elliptical geometric form characteristic for said color video abstract signal.

14. An apparatus in accordance with claim 13 wherein said parabolic waveform configuration mixing means includes means for varying the aspect ratio of the resultant elliptical geometric form characteristic whereby any desired elliptical geometric form including a circle may be provided.

15. An apparatus in accordance with claim 13 wherein said apparatus includes means for providing a horizontal synchronizing signal and a vertical synchronizing signal at different predetermined frequencies, said pattern generation means including means for generating at least one of said pairs of parabolic waveform configurations substantially at said horizontal synchronizing signal frequency and said other one of said pair of parabolic waveform configurations substantially at said vertical synchronizing signal frequency.

16. An apparatus in accordance with claim 1 wherein said color video abstract signal normally provides a color video abstract display having a predetermined polarity, and said controllable mixing means includes means for reversing said polarity at a predetermined frequency so as to provide a strobe effect for said resultant color video abstract display.

17. An apparatus in accordance with claim 1 wherein said pattern generation means includes means for providing at least one other original signal having a different predetermined waveform configuration than said two original signals and being capable of combining with at least one of said two original signals to provide a different complex waveform as said video display having a still different geometric form characteristic than both said one other and said two original signals, said video switch means comprising means for mixing said one other original signal with at least one of said two original signals to provide a different resultant signal having said different complex waveform configuration.

18. An apparatus in accordance with claim 1 wherein said pattern generation means comprises means for providing a different complex waveform configuration from said two original signals, said video switch means mixing said original signals to provide a different resultant signal having said different complex waveform configuration.

* * * * *